US008775762B2

(12) United States Patent
Loh et al.

(10) Patent No.: US 8,775,762 B2
(45) Date of Patent: Jul. 8, 2014

(54) METHOD AND APPARATUS FOR BATCHING MEMORY REQUESTS

(75) Inventors: Gabriel H. Loh, Bellevue, WA (US); Rachata Ausavarungnirun, Pittsburgh, PA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 240 days.

(21) Appl. No.: 13/465,153

(22) Filed: May 7, 2012

(65) Prior Publication Data
US 2013/0297906 A1 Nov. 7, 2013

(51) Int. Cl.
*G06F 12/02* (2006.01)
*G06F 13/16* (2006.01)

(52) U.S. Cl.
CPC .................... *G06F 13/1642* (2013.01)
USPC ........................................ 711/167

(58) Field of Classification Search
CPC ..... G06F 3/0656; G06F 3/0688; G06F 12/02; G06F 12/0246; G06F 13/14; G06F 13/1642; G06F 13/1657; G06F 13/1673
See application file for complete search history.

(56) References Cited

U.S. PATENT DOCUMENTS

| 7,249,229 | B2* | 7/2007 | Ogasawara et al. | 711/154 |
| 7,620,789 | B2* | 11/2009 | Jeddeloh | 711/167 |
| 8,468,318 | B2* | 6/2013 | Colgrove et al. | 711/168 |
| 2009/0248994 | A1* | 10/2009 | Zheng et al. | 711/151 |
| 2011/0078393 | A1* | 3/2011 | Lin | 711/155 |
| 2011/0276974 | A1* | 11/2011 | Chung et al. | 718/103 |

OTHER PUBLICATIONS

Ebrahimi et al., "Fairness via Source Throttling: A Configurable and High-Performance Fairness Substrate for Multi-Core Memory Systems," ASPLOS'10, Mar. 13-17, 2010.
Kaseridis et al., "Minimalist Open-page: A DRAM Page-mode Scheduling Policy for the Many-core Era," MICRO 44, Dec. 3-7, 2011.
Kim et al., "ATLAS: A Scalable and High-Performance Scheduling Algorithm for Multiple Memory Controllers," Carnegie Mellon University.
Kim et al., "Thread Cluster Memory Scheduling: Exploiting Differences in Memory Access Behavior," Carnegie Mellon University.
Muralidhara et al., "Reducing Memory Interference in Multicore Systems via Application-Aware Memory Channel Partitioning," MICRO '11, Dec. 3-7, 2011.
Mutlu and Moscibroda, "Stall-Time Fair Memory Access Scheduling for Chip Multiprocessors," Microsoft Research.
Mutlu and Moscibroda, "Parallelism-Aware Batch Scheduling: Enhancing both Performance and Fairness of Shared DRAM Systems," Microsoft Research.
Rixner et al., "Memory Access Scheduling," ISCA-27, 2000.
Yuan et al., "Complexity Effective Memory Access Scheduling for Many-Core Accelerator Architectures," MICRO '09, Dec. 12-16, 2009.

* cited by examiner

*Primary Examiner* — Hiep Nguyen

(57) ABSTRACT

A memory controller includes a batch unit, a batch scheduler, and a memory command scheduler. The batch unit includes a plurality of source queues for receiving memory requests from a plurality of sources. Each source is associated with a selected one of the source queues. The batch unit is operable to generate batches of memory requests in the source queues. The batch scheduler is operable to select a batch from one of the source queues. The memory command scheduler is operable to receive the selected batch from the batch scheduler and issue the memory requests in the selected batch to a memory interfacing with the memory controller.

24 Claims, 6 Drawing Sheets

METHOD AND APPARATUS FOR BATCHING MEMORY REQUESTS

CROSS-REFERENCE TO RELATED APPLICATIONS

Not applicable.

BACKGROUND

The disclosed subject matter relates generally to computer systems and, more particularly, to a method and apparatus for batching memory requests.

Memory structures, or memory, such as Random Access Memories (RAMs), Static RAMs (SRAMs), Dynamic RAMs (DRAMs) and various levels of cache, have evolved to require increasingly faster and more efficient accesses. As memory technologies have increased in speed and usage, management of memory devices has increased in complexity. Increased demands on system performance coupled with memory management complexity now require efficient, stream-lined memory utilization.

As the number of cores continues to increase in modern chip multiprocessor (CMP) systems, the DRAM memory system is becoming a critical shared resource. Memory requests from multiple central processing unit (CPU) cores interfere with each other, and this inter-application interference is a significant impediment to individual application and overall system performance. Conventional memory controllers have attempted to address the problem by making the memory controller aware of application characteristics and appropriately prioritizing memory requests to improve system performance and fairness.

Recent computer systems present an additional challenge by introducing integrated graphics processing units (GPUs) on the same die with CPU cores. GPU applications typically demand significantly more memory bandwidth than CPU applications due to the GPU's capability of executing a large number of parallel threads. GPUs use single-instruction multiple-data (SIMD) pipelines to concurrently execute multiple threads, where a group of threads running the same instruction is called a wavefront or warp. When a wavefront stalls on a memory instruction, the GPU core hides this memory access latency by switching to another wavefront to avoid stalling the pipeline. Therefore, there can be thousands of outstanding memory requests from across all of the wavefronts. This approach is fundamentally more memory intensive than CPU memory traffic, where each CPU application has a much smaller number of outstanding requests due to the sequential execution model of CPUs.

Previous memory scheduling research has focused on memory interference between applications in CPU-only scenarios. These past approaches are built around a single centralized request buffer at each memory controller (MC). The scheduling algorithm implemented in the MC analyzes the stream of requests in the centralized request buffer to determine application memory characteristics, decides on a priority for each core, and then enforces these priorities. Observable memory characteristics may include the number of requests that result in row-buffer hits, the bank-level parallelism of each core, memory request rates, overall fairness metrics, and other information.

FIG. 1 illustrates memory request scheduling for a request buffer that is shared between a CPU core and a GPU. A conventional structure of the memory scheduler in a memory controller contains a request queue, which stores a list of requests from various hosts sharing the memory. The memory scheduler selects the "best" memory request to service, depending on the memory scheduler algorithm. For example, in FIG. 1, a CPU queue 100 includes four requests A, B and C from the CPU all going to the same page/row. For purposes of illustration, assume there is a time interval between the requests. A GPU queue 110 includes requests W, X, Y, Z that are directed to the same page/row as each other but different than the page/row for requests A, B, and C. Assuming that the current open page is at the same page/row as request A, the memory scheduler will service request A first in the memory controller queue 120, as it is a row hit, which takes less time to process. The memory scheduler then services request W, which will change the current open page to page W and incur a row miss (represented by the shaded block for request W. Requests X, Y and Z are then serviced, since they all hit in the same (now open) row as Request W. While this increases the total number of row buffer hits in the system, it significantly delays the service of Request B (which is also a row buffer miss). Overall, both the CPU and the GPU suffer significant slowdowns compared to a case when they run by themselves without any interference.

The large volume of requests from the GPU occupies a significant fraction of the request buffer, thereby limiting the visibility of the CPU applications' memory behaviors. One possible scenario is when the memory channel is shared by several CPUs, some of which are memory intensive and some are not, and the memory channel is also shared with the GPU. In this scenario, the GPU and memory intensive applications from the CPU will dispatch many memory requests to the memory scheduler. However, these requests generally have more tolerance to memory latency because even though one request is serviced, there are other outstanding requests that halt the progress of the application. In contrast, the applications that are not memory intensive, which are sensitive to any extra memory latency, will not be able to inject their requests into the request queue. From the memory scheduler perspective, there are fewer requests from the CPU in the request buffers, while most of the entries are from the GPU. As a result, the memory scheduler does not have much ability to select the best requests from the pool of CPU requests to quickly service the low-intensity CPU request, increasing the slowdown of the system. This effect results in significant performance degradation for applications that are not memory intensive.

To allow the memory scheduler to schedule these requests effectively, the size of the request queue needs to be significantly larger. The increased request buffer size allows the MC to observe more requests from the CPUs to better characterize their memory behavior. For instance, with a large request buffer, the MC can identify and service multiple requests from one CPU core to the same row such that they become row-buffer hits, however, with a small request buffer, the MC may not even see these requests at the same time because the GPU's requests have occupied the majority of the entries. Very large request buffers impose significant implementation challenges including the die area for the larger structures and the additional circuit complexity for analyzing so many requests, along with the logic needed for assignment and enforcement of priorities. Building a very large, centralized MC request buffer is unattractive due to the resulting area, power, timing and complexity costs.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF EMBODIMENTS

The following presents a simplified summary of only some aspects of embodiments of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a memory controller including a batch unit, a batch scheduler, and a memory command scheduler. The batch unit includes a plurality of source queues for receiving memory requests from a plurality of sources. Each source is associated with a selected one of the source queues. The batch unit is operable to generate batches of memory requests in the source queues. The batch scheduler is operable to select a batch from one of the source queues. The memory command scheduler is operable to receive the selected batch from the batch scheduler and issue the memory requests in the selected batch to a memory interfacing with the memory controller.

Another aspect of the disclosed subject matter is seen in a method that includes receiving a plurality of memory requests from a plurality of sources for accessing a memory. The memory requests are stored in one of a plurality of source queues to generate batches of memory requests in the source queues. Each source is associated with a selected one of the source queues. A particular batch from one of the source queues is selected. The memory is interfaced to issue the memory requests in the particular batch to the memory.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
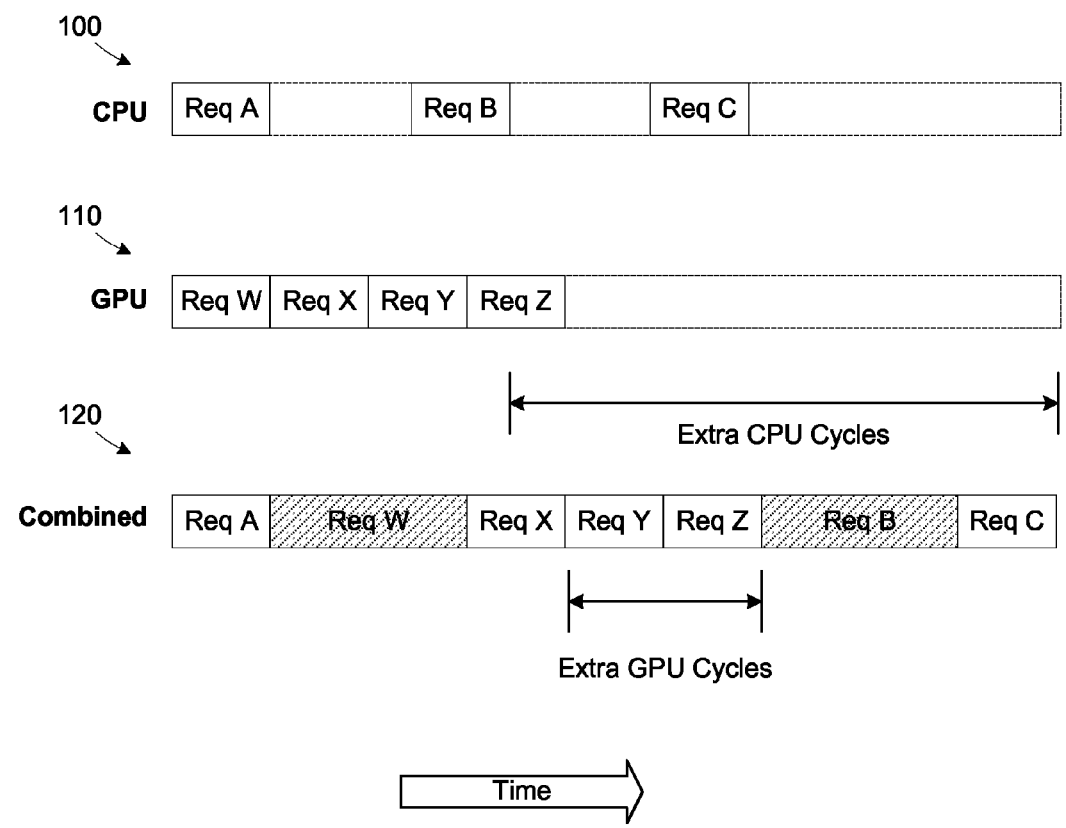
FIG. 1 is a diagram illustrating conventional request queuing for a system with a CPU and a GPU sharing a memory.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
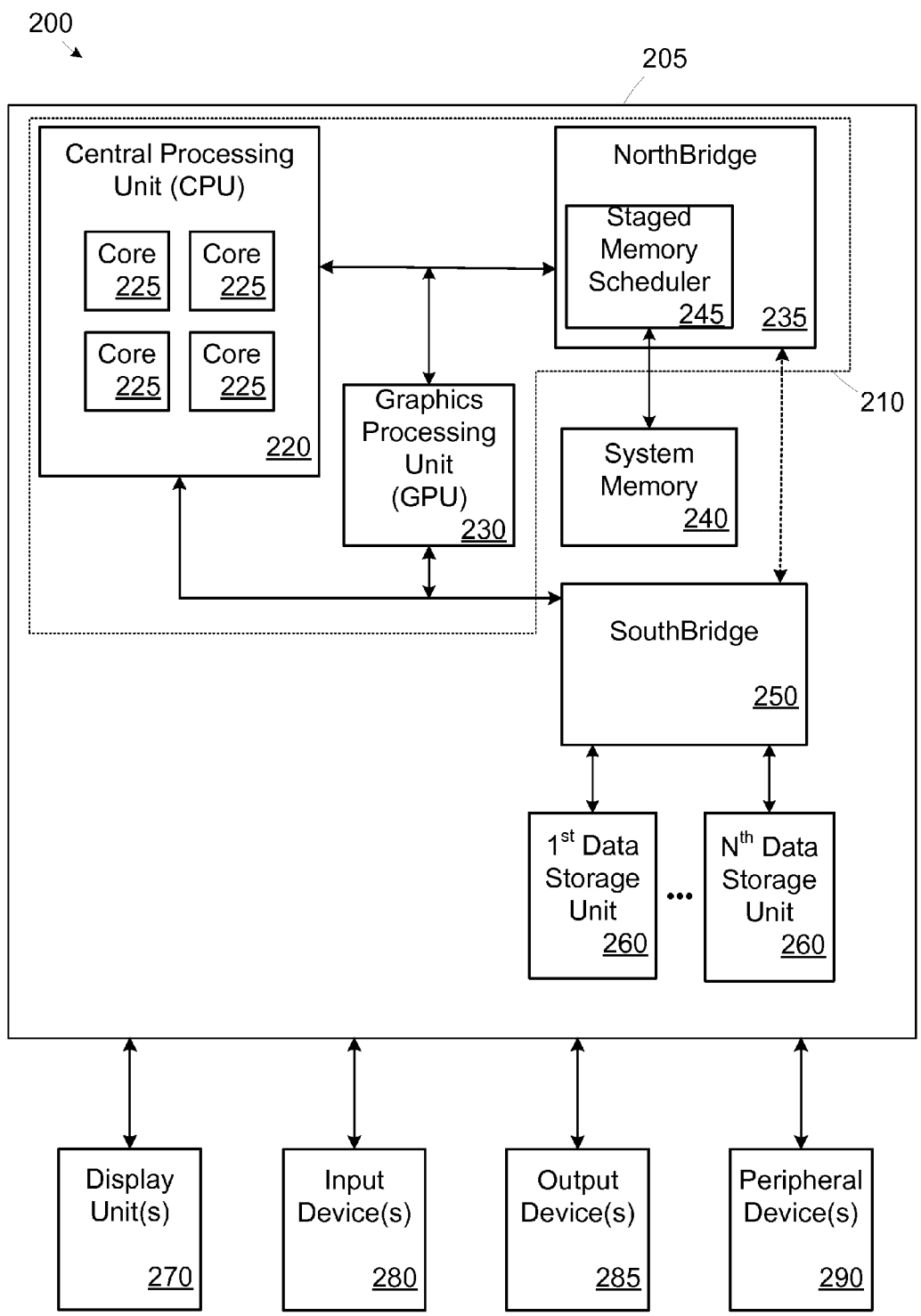
FIG. 2 is a simplified block diagram of a computer system in accordance with an embodiment of the present subject matter.

Turning now to FIG. 2, a block diagram of an exemplary computer system 200, in accordance with an embodiment of the present invention, is illustrated. In various embodiments, the computer system 200 may be a personal computer, a laptop computer, a handheld computer, a netbook computer, a mobile device, a telephone, a personal data assistant (PDA), a server, a mainframe, a work terminal, or the like. The computer system includes a main structure 205, which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the computer system 200 runs an operating system such as Linux, Unix, Windows, Mac OS, or the like.

In the illustrated embodiment, the computer system 200 includes a main structure 205 (e.g., motherboard) to which a central processing unit (CPU) 220 having one or more processing cores 225 and their associated circuitry (e.g., cache memories—not shown) and a graphics processing unit (GPU) 230 are mounted. The CPU 220 and GPU 230 are connected to a northbridge 235. In the illustrated embodiment, the CPU 220, GPU 230, and northbridge 235 may be implemented on a common semiconductor die 210, however separate die may also be used. In certain embodiments, the northbridge 235 may be coupled to system memory 240 via a staged memory scheduler 245 (i.e., memory controller). In other embodiments, the system memory 240 may be coupled directly to the CPU 220, where the staged memory scheduler 245 may be integrated into the CPU 220. The system memory 240 may be of any memory type known in the art, such as dynamic random access memory (DRAM), static random access memory (SRAM), flash memory, phase change memory (PCM), resistive memory (e.g., memristors), etc. The type of system memory 240 does not limit the embodiments of the present subject matter. In one embodiment, the northbridge 235 may be connected to a southbridge 250. The southbridge 250 may be connected to one or more data storage units 260. The data storage units 260 may be hard drives, solid state drives, magnetic tape, or any other writable media used for storing data. In one or more embodiments, the various components of the computer system 200 may be operatively, electrically and/or physically connected or linked with one or more buses.

In some embodiments, the computer system 200 may be connected to one or more display units 270, input devices 280, output devices 285, and/or peripheral devices 290. It is contemplated that these elements may be internal or external to the computer system 200, and may be wired or wirelessly connected, without affecting the scope of the embodiments of the present subject matter. The display units 270 may be internal or external monitors, television screens, handheld device displays, and the like. The input devices 280 may be any one of a keyboard, mouse, track-ball, stylus, mouse pad, mouse button, joystick, scanner or the like. The output devices 285 may be any one of a monitor, printer, plotter, copier or other output device. The peripheral devices 290 may be any other device which can be coupled to a computer, such as a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the computer system 200 are not described herein, such exemplary aspects may or may not be included in various embodiments without limiting the spirit and scope of the embodiments of the present subject matter as would be understood by one of skill in the art.

In other embodiments, the computer system 200 may include other types of processing units in lieu of or in addition to the CPU cores 225 and the GPU 230. Exemplary processing units include an accelerated processing unit (APU), a digital signal processor (DSP), a field-programmable gate array (FPGA), and application-specific integrated circuit (ASIC), etc.

Figure 3:
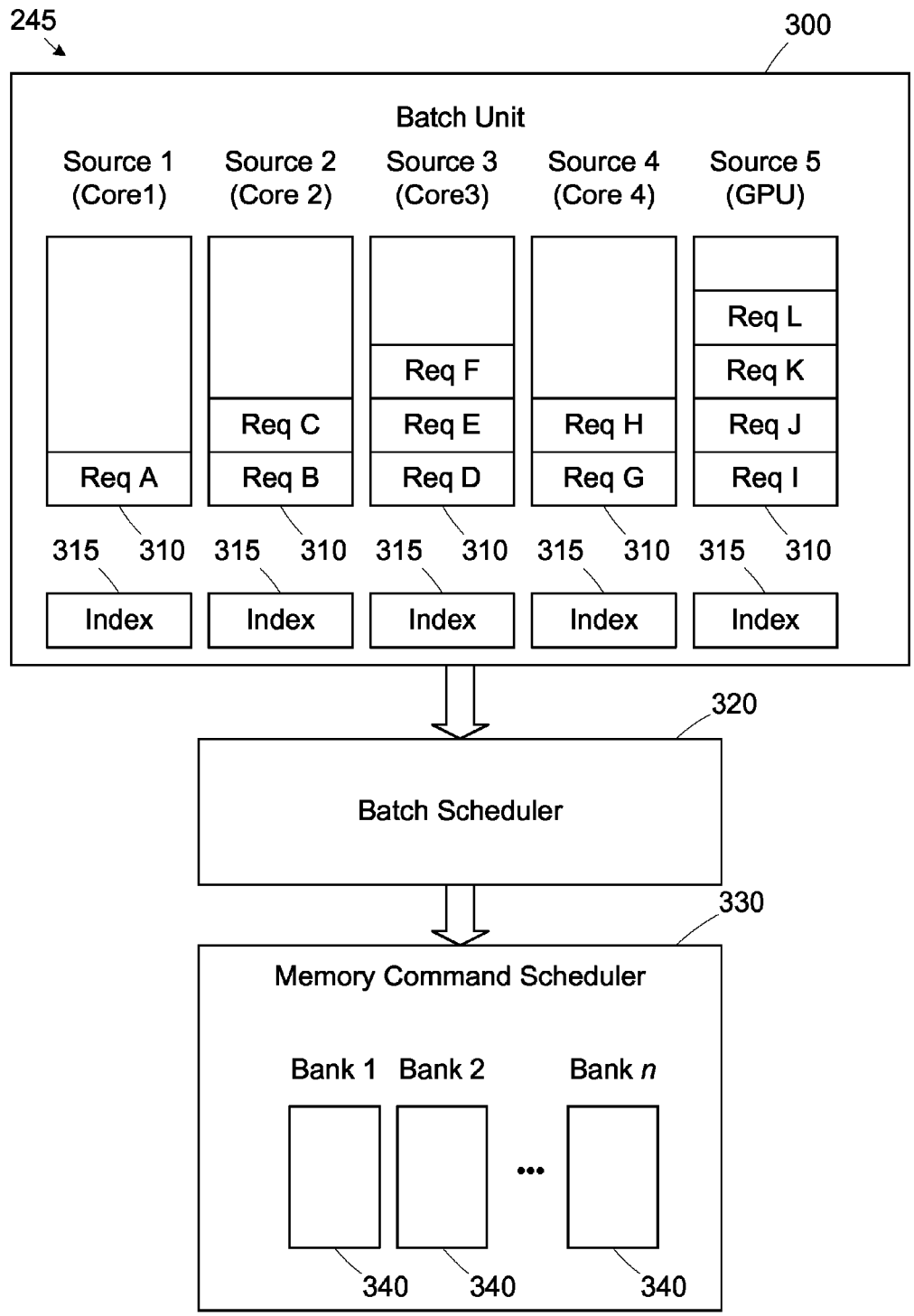
FIG. 3 is a simplified block diagram of a staged memory scheduler in the system of FIG. 2.

FIG. 3 illustrates a simplified diagram of the staged memory scheduler 245 of FIG. 2. The staged memory scheduler 245 provides a decentralized architecture for memory scheduling in the context of integrated multi-core CPU-GPU systems. In general, the staged memory scheduler 245 decouples the various functional requirements of memory controllers and partitions these tasks across several simpler hardware structures that operate in a staged fashion. The functions of the staged memory scheduler 245 include detection of basic within-application memory characteristics (e.g., row-buffer locality), prioritization across applications (CPUs, GPU, and/or other processing units) and enforcement of policies to reflect the priorities, and low-level command scheduling (e.g., activate, precharge, read/write), enforcement of device timing constraints (e.g., $t_{RAS}$, $t_{FAW}$, etc.), and resolving resource conflicts (e.g., data bus arbitration).

As shown in FIG. 3, the staged memory scheduler 245 includes a batch unit 300 having a plurality of first-in-first-out (FIFO) source queues 310, a batch scheduler 320, and a memory command scheduler 330. The batch unit 300 includes one source queue 310 for each processing unit source that can issue memory requests to access the system memory 240 (i.e., a CPU core 225, GPU 230, and/or other processing units). However, in other embodiments, the batch topology may be different. For example, batches may be grouped based on hardware thread ID, process ID (i.e., for multithreaded processes executing on more than one processing unit), etc. It is also contemplated that the operating system may provide information with the memory requests, such as priority information, to define the batch topology or to affect the batch grouping and dispatching rules. Hence, the term "source" in source queue 310 can designate a physical processing unit or a more abstract construct, such as thread or process ID. The number of entries in each source queue 310 may vary depending on the particular source. For example, the number of entries for the GPU 230 may be greater than the number of entries for a CPU core 225, because it is expected that the GPU 230 will have a higher number of outstanding requests.

Each request from a given source (e.g., processing unit or thread) is initially inserted into its respective source queue 310 upon arrival at the staged memory scheduler 245. A batch is generally designated as one or more memory requests from the same source that access the same memory row. That is, all requests within a batch, except perhaps for the first one, would be row-buffer hits if scheduled consecutively. In one embodiment, a particular batch is complete or ready when an incoming request accesses a different row, when the oldest request in the batch or the average age of the batch has exceeded a threshold age, or when the source queue 310 is full. In another embodiment, a batch size threshold may also be used as a batch completion trigger. The various age and batch size thresholds may vary by source. For example, the CPU cores 225 may have one batch size and/or age threshold, while the GPU 230 may have a different, higher batch size and/or older age threshold. In yet another embodiment, priority information may be provided (e.g., by the operating system) for a particular source or for individual memory requests. The priority information may be used to change the batch completion thresholds in terms of age or size.

In some embodiments, each source queue 310 maintains an index register 315 that records the row index of the last request, so that any incoming request's row index can be compared to determine if the request can be added to the existing batch. Note that this approach requires only a single comparator (i.e., used only once at insertion) per source queue 310. Contrast this approach to a conventional monolithic request buffer where comparisons on every request buffer entry (i.e., which is much larger than the number of source queues 310 uses in the batch unit 300) must be made, potentially against all currently open rows across all banks.

Ready batches may be sent to the batch scheduler 320. In general, the batch unit 300 combines individual memory requests into batches of row-buffer hitting requests. Due to this sorting, the batch scheduler 320 deals directly with batches, and therefore is not required to schedule to optimize for row-buffer locality. Instead, the batch scheduler 320 employs higher level policies regarding inter-application interference and fairness. The goal of the batch scheduler 320 is to prioritize batches from applications that are latency critical, while making sure that bandwidth-intensive applications (e.g., the GPU) still make reasonable progress.

The batch scheduler 320 schedules batches of memory requests from the batch unit 300 depending on a predetermined algorithm. The batch scheduler 320 may rank each batch based on various metrics, and send a batch with the highest rank/priority to the memory command scheduler 330 to be issued to the system memory 240 (see FIG. 2). In one embodiment, the batch scheduler 320 ranks batches based on the size of the batch, while de-prioritizing batches of GPU requests unless they become urgent (e.g., exceed a threshold age). If the ranks of two or more batches are equal, the batch scheduler 320 next considers bank level parallelism and dispatches batches from the source having the higher bank level parallelism. If batches are still tied after evaluating bank level parallelism, the batch scheduler 320 prioritizes the oldest batch. Other batch prioritization techniques include shortest-job first (SJF) and round-robin principles. For SJF, the batch scheduler 320 chooses the source with the fewest total memory requests across all three stages of the staged memory scheduler 245. SJF prioritization reduces average request service latency, and it tends to favor latency-sensitive applications, which tend to have fewer total requests. In a round-robin approach, the batch scheduler 320 cycles through each of the per-source source queues 310, ensuring that high memory-intensity applications receive adequate service. These various batch scheduling techniques are intended to be illustrative and not exhaustive or limiting. Other priority policies may be employed, alone or in combination with other techniques.

In some embodiments, the batch scheduler 320 uses a probabilistic approach to select between multiple prioritization policies. For example, a plurality of policies may be selected, and each one may be assigned a weight such that the sum of the weights equals 100%. In one example, a probability of 90% may be assigned to a SJF policy and a 10% probability may be assigned to a round-robin policy otherwise. The batch scheduler then randomly chooses a policy for the next batch based on the weighted probabilities. In a round robin approach, the batch scheduler 320 may de-prioritize the GPU by servicing one GPU batch for every n batches from the other sources (e.g., 1 GPU batch for every two batches from the other sources).

In the illustrated embodiment, the batch scheduler 320 may be implemented using combinatorial logic to implement the batch selection rules. When using the SJF policy, the batch scheduler 320 only needs to pick the batch corresponding to the source with the fewest in-flight requests, which can be performed with a tree of MIN operators. Note that this tree is relatively shallow since it only grows as a function of the number of source queues 310.

After selecting a particular batch, the batch scheduler 320 forwards the requests from the selected batch to the memory command scheduler 330. The batch scheduler 320 de-queues one request per cycle until all requests from the batch have been removed from the selected source queue 310. At this point, the batch scheduler 320 returns to select the next batch. The memory command scheduler 330 includes one bank queue 340 per bank in the system memory 240 (e.g., eight banks/FIFOs per rank for DDR3). The batch scheduler 320 places the memory requests directly into the bank queues 340. Note that because batches are moved into the bank queues 340 one batch at a time, any row-buffer locality within a batch is preserved within a particular bank queue 340. At this point, any higher-level policy decisions have already been made by the batch scheduler 320, so the memory command scheduler 330 can focus on issuing low-level memory commands and ensuring DDR protocol compliance.

On any given cycle, the memory command scheduler 330 only considers the requests at the head of each of the bank queues 340. For each request, the memory command scheduler 330 determines whether that request can issue a command based on the request's current row-buffer state (i.e., is the row buffer already open with the requested row, closed, or open with the wrong row?) and the current memory state (e.g., time elapsed since a row was opened in a bank, data bus availability, etc.). If more than one request is eligible to issue a command, the memory command scheduler 330 may arbitrate in a round-robin fashion.

Figure 4:
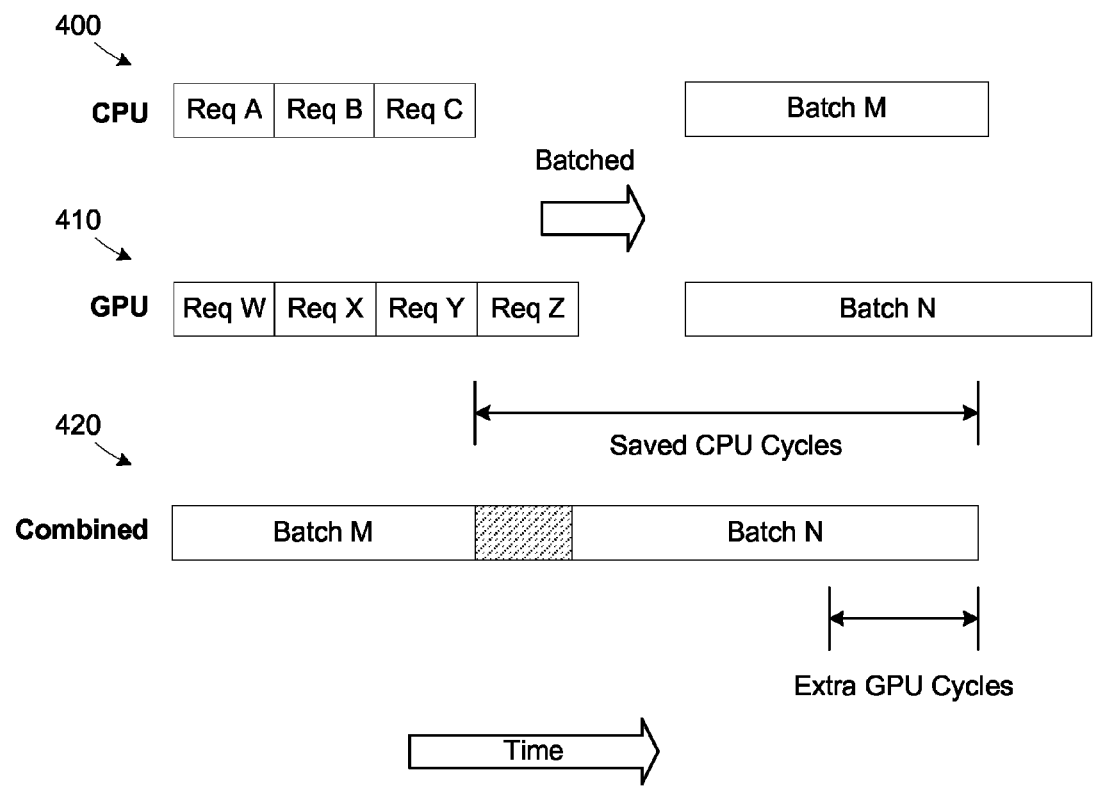
FIG. 4 is a diagram illustrating the operation of the staged memory scheduler of FIG. 3 in queuing memory requests.

FIG. 4 illustrates memory request scheduling for the staged memory scheduler 245. As in the example described in FIG. 1, a CPU queue 400 (e.g., one of the source queues 310) includes four requests A, B and C from the CPU all going to the same page/row. A GPU queue 410 (e.g., another one of the source queues 310) includes requests W, X, Y, Z that are directed to the same page/row as each other but different than the page/row for requests A, B, and C. The batch unit 300 generates a batch M for the CPU requests and a batch N for the GPU requests. Assuming that CPU requests are given priority and/or the current open page is at the same page/row as request A, the batch scheduler 320 will dispatch batch M first in the combined queue 420 to the memory command scheduler 330. Subsequently, batch N is processed, resulting in the opening of a new row in the system memory 240. Overall, the CPU 220 achieves cycle savings, while the less time-sensitive GPU 230 experiences some delay.

Figure 5:
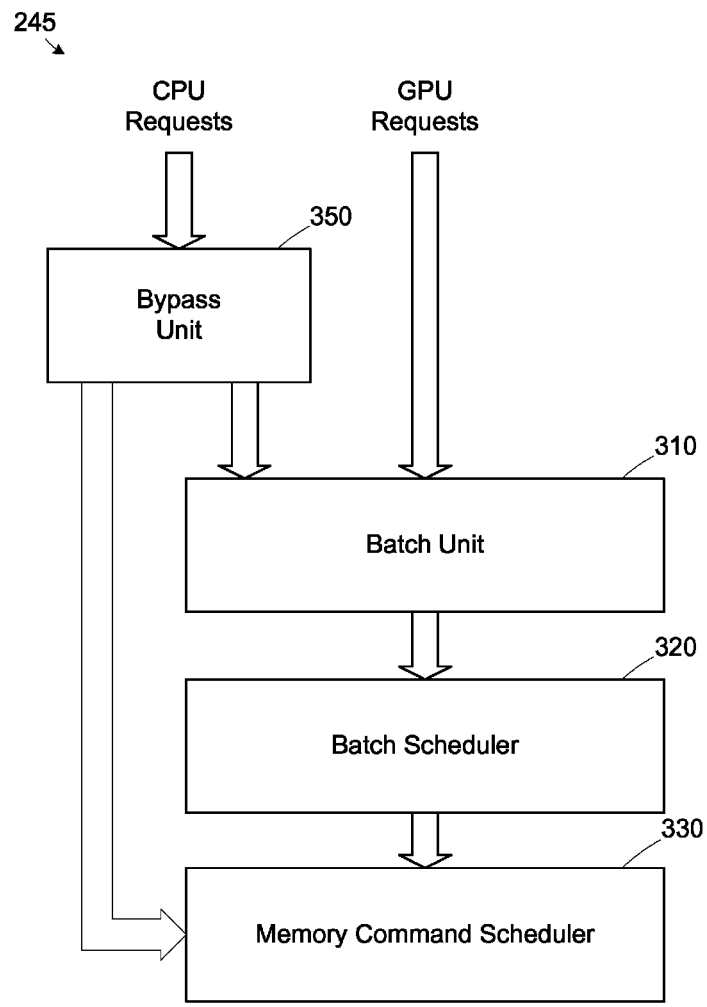
FIG. 5 is a simplified block diagram of an alternative embodiment of a staged memory scheduler in the system of FIG. 2.

In another embodiment illustrated in FIG. 5, the staged memory scheduler 245 considers the memory intensity of the source when forming batches. As illustrated in FIG. 5, the staged memory scheduler 245 includes a bypass unit 350 that can selectively bypass the batch unit 300 and the batch scheduler 320 and issue requests directly the memory command scheduler 330 if certain conditions are met. In the embodiment illustrated in FIG. 5, the requests form the CPU 220 are eligible for bypass consideration, while the requests from the GPU 230 always go through the batch unit 300. This configuration generally arises from the transaction characteristics of the GPU 230 where a large number of requests are typically issued and the latency sensitivity is generally low. Of course, in other embodiments, GPU transactions may also be eligible for bypass consideration.

In the exemplary batching scheme described above in reference to FIG. 3, the batch unit 300 holds requests in the source queue 310 until a complete batch is ready. This batch triggering technique could significantly delay some requests, as the batch will not be marked ready until a request to a different row arrives at the MC, the source queue 310 is full, a time threshold is exceeded, or the batch size limit is reached. This queuing delay can have a significant performance effect for low-intensity, latency-sensitive applications. Memory intensity may be measured in terms of misses per kilo cycles (MPKC).

For sources with low memory intensity (<1 MPKC), the staged memory scheduler 245 enables the bypass unit 350 to bypass the batch unit 300 and batch scheduler 320 and forward the requests directly to the memory command scheduler 330. For such highly sensitive sources, such a bypass policy minimizes the delay to service the requests. The bypass operation does not interrupt any on-going dispatches from the batch scheduler 320, thereby providing that any separately scheduled batches maintain their row-buffer locality. For medium memory-intensity sources (1-10 MPKC) and high memory-intensity (>10 MPKC) sources, the batch unit 300 may use variable age thresholds (e.g., 50 and 200 cycles, respectively). Thus, the batch unit 300 may use different batch triggers for each source queue 310.

As illustrated above, the staged memory scheduler 245 may use MPKC as a metric of memory intensity. Conventional, thread cluster memory (TCM) scheduling uses a misses by kilo instruction (MPKI) metric to classify memory intensity. Generally, the staged memory scheduler 245 uses MPKC because the per-application instruction counts may not be available at the level of the staged memory scheduler 245. However, it is contemplated that MPKI information may be provided to the staged memory scheduler 245 and used to estimate memory intensity, but this approach would require additional implementation overhead.

As described above, low memory-intensity applications can bypass the entire batch formation and scheduling process and proceed directly to the DCS. In other embodiments, even for high memory-intensity applications, if the memory system is lightly loaded (e.g., if only a few applications are running on the system 200), then the staged memory scheduler 245 may be configured to allow all requests to proceed directly to the memory command scheduler 330. This bypass may be enabled whenever the total number of in-flight requests (across all sources) in the staged memory scheduler 245 is less than a predetermined threshold (e.g., sixteen requests).

In addition to the source queues 310 and bank queues 340, the staged memory scheduler 245 may implement bookkeeping counters. The batch unit 300 may implement one counter per source to track the number of in-flight requests. Each counter is incremented when a request arrives at the staged memory scheduler 245, and then decremented when the request is complete. Counters are also provided in the batch unit 300 to track per-source MPKC rates for memory-intensity classification, which are incremented when a request arrives and then periodically reset.

Figure 6:
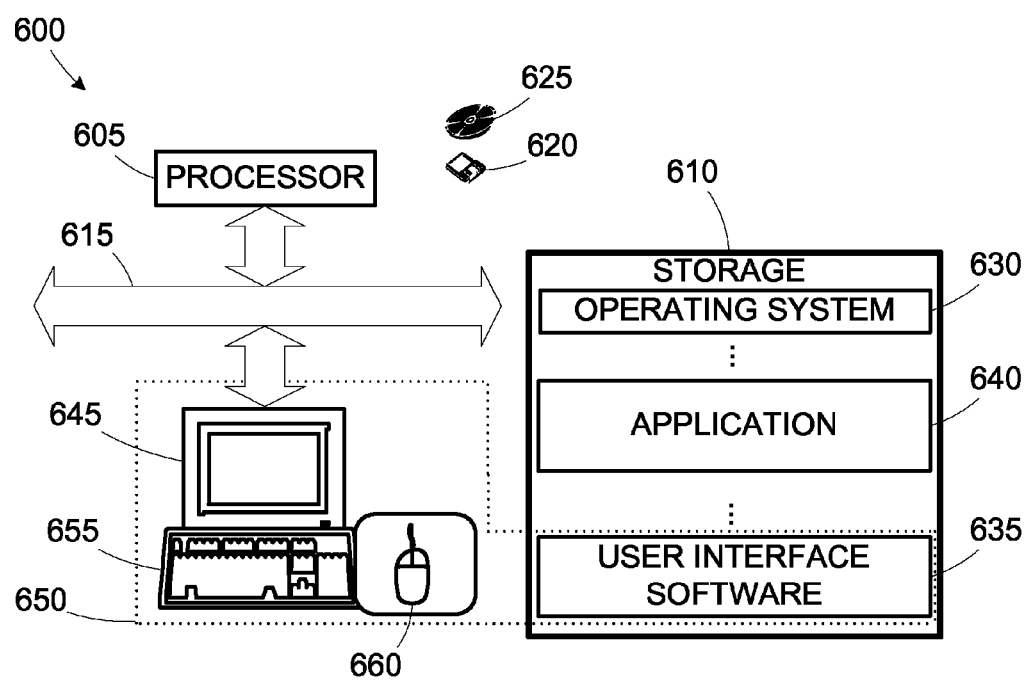
FIG. 6 is a simplified diagram of a computing apparatus that may be programmed to direct the fabrication of a staged memory scheduler in the system of FIG. 2.

FIG. 6 illustrates a simplified diagram of selected portions of the hardware and software architecture of a computing apparatus 600 such as may be employed in some aspects of the present subject matter. The computing apparatus 600 includes a processor 605 communicating with storage 610 over a bus system 615. The storage 610 may include a hard disk and/or random access memory (RAM) and/or removable storage, such as a magnetic disk 620 or an optical disk 625. The storage 610 is also encoded with an operating system 630, user interface software 635, and an application 640. The user interface software 635, in conjunction with a display 645, implements a user interface 650. The user interface 650 may include peripheral I/O devices such as a keypad or keyboard 655, mouse 660, etc. The processor 605 runs under the control of the operating system 630, which may be practically any operating system known in the art. The application 640 is invoked by the operating system 630 upon power up, reset, user interaction, etc., depending on the implementation of the operating system 630. The application 640, when invoked, performs a method of the present subject matter. The user may invoke the application 640 in conventional fashion through the user interface 650. Note that although a stand-alone system is illustrated, there is no need for the data to reside on the same computing apparatus 600 as the simulation application 640 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., storage 610, disks 620, 625, solid state storage, and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into the computing apparatus 600, and executed by the processor 605 using the application 665, which may then control, in whole or part, the operation of a semiconductor manufacturing facility (or fab) to create semiconductor products and devices. For example, in one embodiment, silicon wafers containing portions of the computer system 200 illustrated in FIG. 2, 3, or 5 may be created using the GDSII data (or other similar data).

The staged memory scheduler 245 described herein provides advantages for systems with multiple sources for issuing memory requests, including systems with multiple CPU cores 225 and an integrated GPU 230. The staged memory scheduler 245 employs simple distributed FIFO queues 310 to form row-buffer hitting memory requests into batches to preserve row-buffer locality. Hence, the bandwidth-intensive GPU requests are prevented from interleaving within CPU request batches. Then, the staged memory scheduler 245 schedules memory requests at batch granularity to achieve high system performance and fairness. The staged memory scheduler 245 can dynamically adapt to load conditions and source memory-intensity using bypass logic that allows requests to be serviced without batching for low-intensity applications or in times of low system load.

Although the operation of the staged memory scheduler 245 is described in the context of a system with multiple CPU cores 225 and an integrated GPU 230 sharing the same memory channels as the CPU, it is contemplated that it may also be applied to a large chip-multiprocessor system, where several nodes can inject memory requests and potentially flood the request buffers, causing the memory scheduler to become full. The batch unit 300 and batch scheduler 320 can mitigate such problems by batching nodes that generate a high level of memory requests. The staged memory scheduler 245 can also be employed in other system organizations with more than one GPU 230, with any number of CPUs 220, with direct memory access (DMA) engines, peripheral devices, hardware accelerators, or any plurality of computing devices that send requests to the memory 240. It is contemplated that the staged memory scheduler 245 can be implemented in an integrated memory controller, however, the present subject matter is equally applicable to off-chip memory controllers, either implemented as a separate, stand-alone chip (e.g., Northbridge chip), or even directly integrated into a die-stacked memory implementation that uses a built-in logic/interface chip.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A memory controller, comprising:
   a batch unit comprising a plurality of source queues for receiving memory requests from a plurality of sources, each source being associated with a selected one of the source queues, wherein the batch unit is operable to generate batches of memory requests in the source queues;
   a batch scheduler operable to select a batch from one of the source queues; and
   a memory command scheduler operable to receive the selected batch from the batch scheduler and issue the memory requests in the selected batch to a memory interfacing with the memory controller.

2. The memory controller of claim 1, wherein the batch unit is operable to designate a particular batch as being complete responsive to identifying an incoming memory request from a source addressing a different row in the memory than other memory requests present in the particular batch.

3. The memory controller of claim 1, wherein the batch unit is operable to designate a particular batch as being complete responsive to an age of at least one memory request in the particular batch exceeding an age threshold.

4. The memory controller of claim 3, wherein the batch unit is operable to employ different age thresholds for at least two of the source queues.

5. The memory controller of claim 4, wherein the batch unit is operable to determine an age threshold for at least one of the source queues based on a memory intensity metric of the source associated with the at least one source queue.

6. The memory controller of claim 1, wherein the batch unit is operable to designate a particular batch as being complete responsive to a size of the particular batch exceeding a size threshold.

7. The memory controller of claim 6, wherein the batch unit is operable to employ different size thresholds for at least two of the source queues.

8. The memory controller of claim 1, wherein the batch scheduler is operable to select the batch from the batch unit having a largest size.

9. The memory controller of claim 1, wherein the batch scheduler is operable to select the batch from the batch unit having a highest degree of bank level parallelism.

10. The memory controller of claim 1, wherein the batch scheduler is operable to select the batch from the batch unit having the oldest age.

11. The memory controller of claim 1, wherein the batch scheduler is operable to select the batch from the batch unit associated with the source having a fewest number of memory requests.

12. The memory controller of claim 1, wherein the batch scheduler is operable to select the batch from the batch unit using a round robin policy that selects batches from each source sequentially.

13. The memory controller of claim 1, wherein the batch scheduler is operable to randomly select one of a plurality of batch selection policies and select the batch from the batch unit based on the randomly selected policy.

14. The memory controller of claim 1, wherein the memory command scheduler includes a plurality of bank queues for interfacing with different banks of the memory, and the memory command scheduler is operable to store the selected batch in a bank queue based on a particular bank addressed by the memory requests in the selected batch.

15. The memory controller of claim 14, wherein the memory command scheduler is operable to select a memory request from one of the bank queues based on the selected memory request addressing an open row of the memory.

16. The memory controller of claim 14, wherein the memory command scheduler is operable to select a memory request from one of the bank queues based on an age of the selected memory request.

17. The memory controller of claim 1, further comprising a bypass unit coupled to the batch unit and the memory command scheduler and operable to forward a selected memory request to the memory command scheduler and bypass the batch unit.

18. The memory controller of claim 17, wherein the bypass unit is operable to forward the selected memory request to the memory command scheduler based on a particular source associated with the selected memory request.

19. The memory controller of claim 18, wherein the bypass unit is operable to forward the selected memory request to the memory command scheduler based on a memory intensity metric associated with the particular source.

20. The memory controller of claim 17, wherein the bypass unit is operable to forward the selected memory request to the memory command scheduler based a total number of requests being serviced by the memory controller being less than a predetermined threshold.

21. The memory controller of claim 1, wherein the plurality of sources comprise a plurality of processing units.

22. A computer system, comprising:
   a memory;
   a plurality of processing units operable to issue memory requests for accessing the memory; and
   a memory controller, comprising:
      a batch unit comprising a plurality of source queues for receiving memory requests from a plurality of sources, each source being associated with a selected one of the source queues, wherein the batch unit is operable to generate batches of memory requests in the source queues;
      a batch scheduler operable to select a batch from one of the source queues; and
      a memory command scheduler operable to receive the selected batch from the batch scheduler and issue the memory requests in the selected batch to a memory interfacing with the memory controller.

23. A method, comprising:
   receiving a plurality of memory requests from a plurality of sources for accessing a memory;
   storing the memory request in one of a plurality of source queues to generate batches of memory requests in the source queues, wherein each source is associated with a selected one of the source queues;
   selecting a particular batch from one of the source queues; and
   interfacing with the memory to issue the memory requests in the particular batch to the memory.

24. A computer readable storage device encoded with data that, when implemented in a manufacturing facility, adapts the manufacturing facility to create a device, comprising:
   a memory controller, comprising:

a batch unit comprising a plurality of source queues for receiving memory requests from a plurality of sources, each source being associated with a selected one of the source queues, wherein the batch unit is operable to generate batches of memory requests in the source queues;

a batch scheduler operable to select a batch from one of the source queues; and a memory command scheduler operable to receive the selected batch from the batch scheduler and issue the memory requests in the selected batch to a memory interfacing with the memory controller.

* * * * *